(12) United States Patent
Cai et al.

(10) Patent No.: US 10,003,696 B2
(45) Date of Patent: Jun. 19, 2018

(54) DISTRIBUTED COLLABORATIVE OFFLINE CHARGING SYSTEM

(71) Applicant: Provenance Asset Group LLC, Essex, CT (US)

(72) Inventors: Yigang Cai, Naperville, IL (US); Ranjan Sharma, New Albany, OH (US)

(73) Assignee: Provenance Asset Group LLC, Essex, CT (US)

( * ) Notice: Subject to any disclaimer, the term of this patent is extended or adjusted under 35 U.S.C. 154(b) by 330 days.

(21) Appl. No.: 14/230,501

(22) Filed: Mar. 31, 2014

(65) Prior Publication Data

US 2015/0281464 A1    Oct. 1, 2015

(51) Int. Cl.
  *H04M 15/00*    (2006.01)
  *H04W 4/24*    (2018.01)
  *H04L 12/14*    (2006.01)

(52) U.S. Cl.
  CPC ............ *H04M 15/65* (2013.01); *H04M 15/00* (2013.01); *H04M 15/31* (2013.01); *H04M 15/41* (2013.01); *H04M 15/61* (2013.01); *H04W 4/24* (2013.01); *H04L 12/1407* (2013.01)

(58) Field of Classification Search
  CPC ........ H04M 15/65; H04M 15/41; H04W 4/24
  USPC .................................................. 455/406, 408
  See application file for complete search history.

(56) References Cited

U.S. PATENT DOCUMENTS

| | | | | |
|---|---|---|---|---|
| 6,052,448 A * | 4/2000 | Janning | ................ | H04M 15/00 379/115.01 |
| 8,406,398 B2 * | 3/2013 | Gore | .................... | H04M 15/00 370/312 |
| 2004/0152443 A1 * | 8/2004 | Koskinen | ................ | H04L 12/14 455/406 |
| 2010/0290610 A1 * | 11/2010 | Gore | .................... | H04M 15/00 379/142.15 |
| 2013/0318191 A1 * | 11/2013 | Yin | ........................ | H04L 69/28 709/213 |

OTHER PUBLICATIONS

3rd Generation Partnership Project; Technical Specification Group Services and System Aspects; Telecommunication management; Charging management; Charging architecture and principles (Release 12) v12.3.0(Dec. 2013).*

* cited by examiner

*Primary Examiner* — Vladimir Magloire
*Assistant Examiner* — Don Braswell
(74) *Attorney, Agent, or Firm* — Dinsmore & Shohl LLP

(57) ABSTRACT

A distributed collaborative offline charging system and method is provided. Charging is determined by receiving a reduced charging record at a charging control function. The reduced charging record includes a charging data subset and an index for charging parameters that are not included in reduced charging record. The charging control function retrieves the charging parameters that are not included in reduced charging record utilizing the index.

22 Claims, 2 Drawing Sheets

DISTRIBUTED COLLABORATIVE OFFLINE CHARGING SYSTEM

FIELD OF THE INVENTION

The present invention relates generally to communication systems.

BACKGROUND OF THE INVENTION

The following is a list of acronyms used in the patent application.
3GPP 3rd Generation Partnership Project
ACR Automatic Charging Relay
AVP Attribute Value Pair
BD Billing Domain
CCF Charging Collection Function
CDF Charging Data Function
CDR Charging Data Record
CGF Charging Gateway Function
CPU Central Processing Unit
CTF Charging Trigger Function
EPC Evolved Packet Core
IMS IP Multimedia Subsystem
LTE Long Term Evolution
MMSC Multimedia Messaging Service Centre
MMTel MultiMedia Telephony service
P-CSCF Proxy Call Session Control Function
PCC Policy and Charging Control
PCEF Policy Charging Enforcement Function
PCRF Policy and Charging Rules Function
PGW PDN Gateway
Rf Radio frequency
SMSC Short Message Service Center
TTL Time To Live In network centralized charging architectures, network elements can create their own CDRs. Service providers often centralize this functionality in an offline charging system so that they can exercise tighter control on the format and contents of the CDRs produced centrally. Unfortunately, in a multi-vendor networks an operator incurs higher expenses if several vendors have to make modifications to CDRs, rather than having the changes done centrally at the CCF.

In typical communication systems, the network elements do not create CDRs locally but rather send charging information to a CCF for both event and session based charging. The CCF typically creates a CDR per charging information received from network elements. In this architecture, network elements have to collect charging related parameters and send to the CCF in a real-time fashion, even if it is an offline charge.

The CDRs in current communication systems include every bit of information that can be culled from the CTFs/Network Elements. This leads to a relatively large CDR. The CDR is handled by the downstream billing mediation system, which typically cuts away the non-essential information and thereby negates the processing applied by the upstream elements, namely network elements. This wastes bandwidth in transmission of such data.

With increasing functions and features in communication networks, such as LTE/EPC networks, required mandatory and optional charging parameters have exponentially increased in last few years. Network elements collect a large number of charging parameters in real time and stuff them in ACR request messages to the CCF. Viewed as a single message, it may be a minimal amount of processing for today's high performance computing platforms. However, with the usage seen in LTE/EPC, for example, there may be millions of sessions going on simultaneously, and an operator invests in the equipment with the performance engineering requirements for the peak traffic to handle subscriber demand. It costs significant network elements CPU time and storage space for collecting and caching these parameters. It also increases the size of the Rf ACR message sent to the CCF which has to process the ACR with large data immediately.

Therefore, current systems waste computing resources and network bandwidth. Additionally, the transmission of large amounts of data in real-time for an offline charging mechanism is inefficient and overly consumes system bandwidth.

BRIEF SUMMARY OF THE INVENTION

An exemplary embodiment proposes a charging architecture in which PCEF/CTFs supply a few necessary AVPs in a reduced ACR towards the CCF. The CCF retrieves most of charging parameters from network databases offline before or even after it creates a CDR. An exemplary embodiment thereby provides a conservation of throughput through the communication system.

Further, an exemplary embodiment optimizes the amount of data transferred between network elements. This significantly reduces the burden on the network elements to provide charging parameters in real time for offline charging. With this new feature, fewer new parameters are added into Rf ACR messages when functions and features are added in wireless networks.

In accordance with an exemplary embodiment, wireless network elements are not required to collect and pass the majority of charging related parameters in real-time for offline charging. Further, PCEFs preferably only send reduced ACRs to the CCF, which significantly increases the throughput towards the CCF and reduces the bandwidth on the networks. Additionally, an index is added in the reduced ACR that allows the CCF to retrieve offline the needed charging data from network databases efficiently while using a minimum of network bandwidth.

Still further, an exemplary embodiment provides for a policy engine to guide the charging data retrieving and CDR generation. In addition, the assembly of the CDR is preferably done in multiple stages across CDF, CGF and BD, with distributed processing logic that applies to fill in the final template desired in an operator deployment of billing functionality.

DETAILED DESCRIPTION OF THE INVENTION

Figure 1:
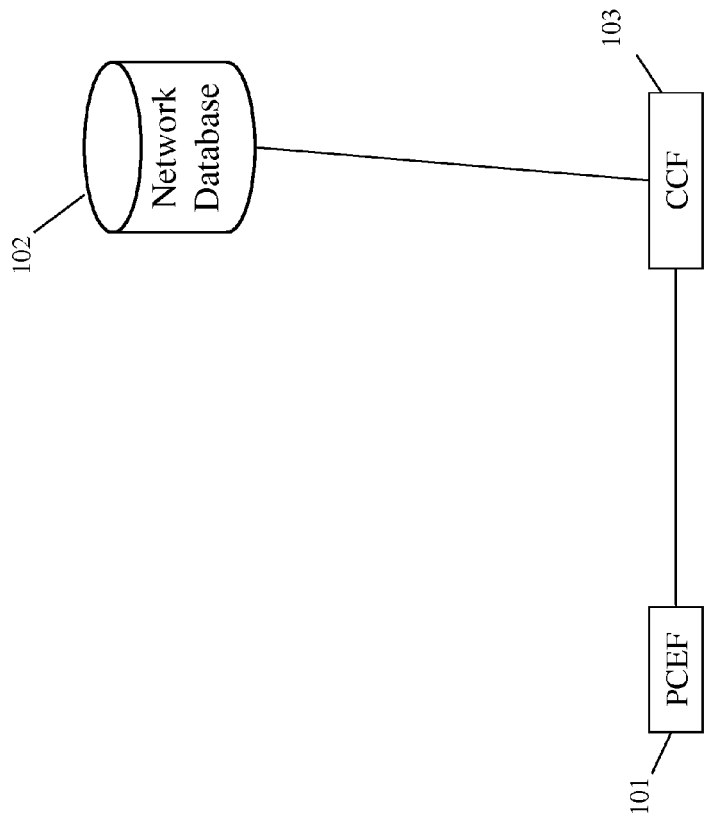
FIG. 1 depicts the functional architecture of a communication network in accordance with an exemplary embodiment of the present invention.

FIG. 1 depicts the functional architecture of a communication network 100 in accordance with an exemplary embodiment of the present invention. An exemplary embodiment of the present invention proposes a charging architecture in which charging functions supply only a few necessary AVPs in a reduced ACR towards CCF 103, and CCF 103 retrieves most of the charging parameters from Network Databases 102 offline. This can occur before or after the CCF creates the CDR. By reducing the ACR, the burden on the network elements to provide charging parameters for offline charging is significantly reduced. This provides for fewer new parameters to be added to new Rf ACR messages, thereby minimizing system resource usage.

Communication network 100 preferably includes PCEF 101, Network Database 102, and CCF 103. It should be understood that additional network elements can be included in communication network 100, but only these three are depicted for clarity.

PCEF 101 is a network element that performs policy management, in particular policy-based traffic management and traffic shaping. PCEF 101 preferably enables the definition and application of business and operational rules, or policies, in Communication Network 100 and across telecommunication businesses. PCEF 101 can be a CTF or a PCEF. PCEF 101 provides the policy and charging enforcement function. In a 3GPP network, the PCRF and PCEF, along with the P-CSCF, make up the 3GPP PCC function.

Network Database 102 is a database for storing, among other things, data for offline charging. Network DB 102 preferably stores call and session related data, which may or may not be related to charging. Network DB 102 can be a single database or a collection of databases, such as categorized databases, a centralized database, or individual service databases.

Network DB 102 stores data that includes charging related information. The charging related data is preferably stored per call/session per subscriber, and can be retrieved per call/session per subscriber. In an exemplary embodiment, the charging related information is indexed.

CCF 103 is a charging and billing system that creates and consolidates offline CDRs for IMS, LTE and various other network elements, to simplify billing system integration, maximize subscriber revenue, and reduce costs. CCF 103 can comprise a CDF, a CGF, a BD, or a combination of the three.

Figure 2:
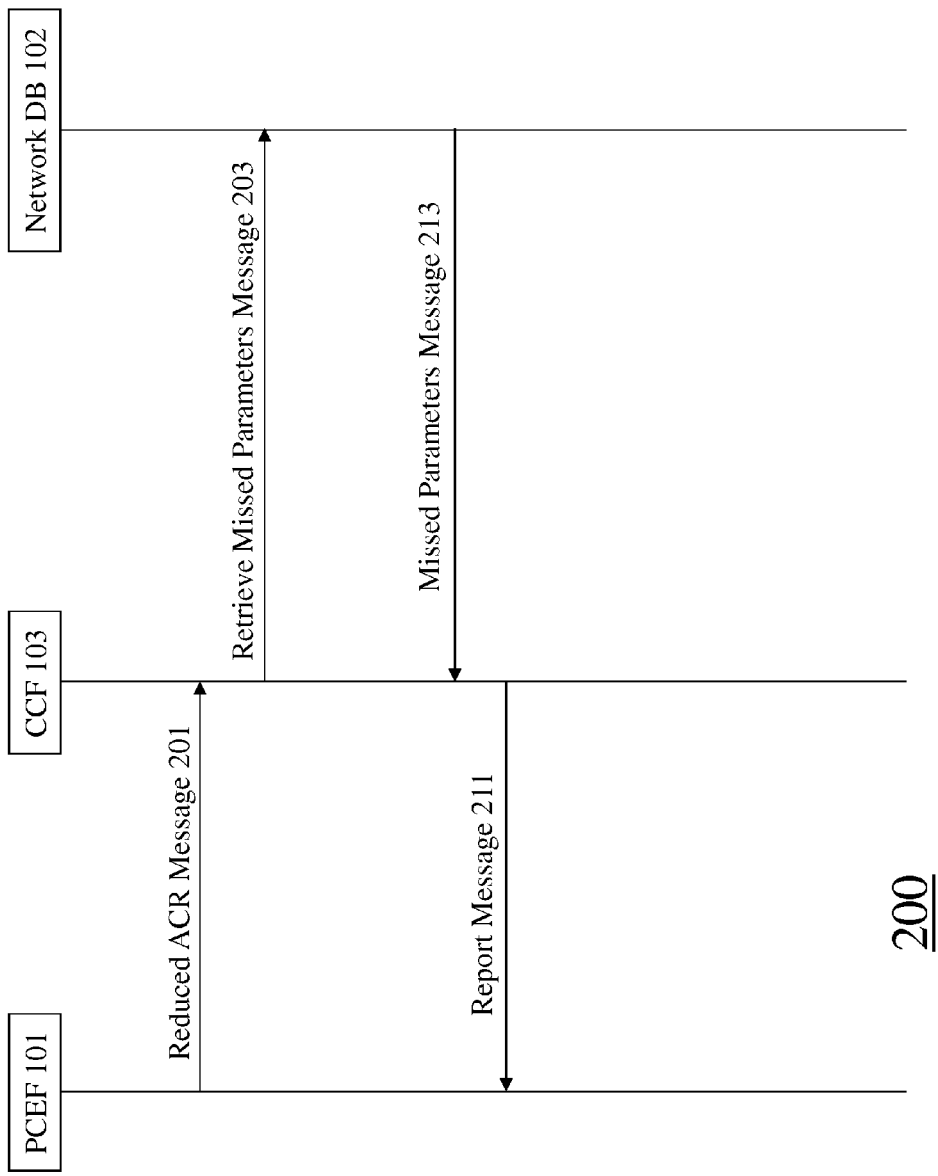
FIG. 2 depicts a call flow diagram in accordance with an exemplary embodiment of the present invention.

FIG. 2 depicts a call flow diagram 200 in accordance with an exemplary embodiment of the present invention. In accordance with this exemplary embodiment, PCEF 101 does not include complete charging information in ACR messages. An exemplary embodiment provides an ACR for event- and session-based charging.

In accordance with an exemplary embodiment, PCEF 101 sends Reduced ACR Message 201 to CCF 103. Reduced ACR Message 201 preferably includes a subset of data and an index for parameters that are not included in Reduced ACR Message 201. The data preferably includes only the AVPs that are required to provide charging for the call or session, which includes positional as well as non-positional AVPs. The index preferably includes not included call/session data, network data, or service data. The network data can be, for example, CTF data. The service data can be, for example, PS, SMSC, MMSC, or MMTel. The index can include single service charging information data or multiple service charging information data.

CCF 103 sends Retrieve Missed Parameters Message 203 to Network DB 102 to retrieve missed parameters/field to generate complete CDRs. The index allows CCF 103 to know which charging parameters are omitted from Reduced ACR Message 201 so that CCF 103 can populate them by requesting them from Network DB 102.

When CCF 103 receives Reduced ACR Message 201, CCF 103 creates a reduced CDR. In accordance with an exemplary embodiment, the reduced CDR does not include the missed parameters/fields in the reduced ACR. Creating the reduced CDR provides for a closure to charging transactions without involving a long wait.

In accordance with a first exemplary embodiment, CCF 103 optimizes the retrieval of missed parameters by determining not to retrieve information that would be repetitious, such as information that CCF 103 already has.

In accordance with a further exemplary embodiment, CCF 103 optimizes the retrieval of missed parameters by adding a new index to obtain additional charging data.

In accordance with a further exemplary embodiment, CCF 103 optimizes the retrieval of missed parameters by defining a "time-to-live" (TTL) parameter. The TTL parameter relates to recently fetched information from a database and determines if a new query should be made for a parameter or should a previously cached version of the parameter can be utilized.

In accordance with a further exemplary embodiment, CCF 103 optimizes the retrieval of missed parameters by configuring the policy engine, preferably via inputs from the billing domain, if certain parameters are of no interest to the billing domain. In such cases, queries for those parameters are preferably turned off.

In accordance with a further exemplary embodiment, CCF 103 optimizes the retrieval of missed parameters by defining a fetch responsibility. The fetch responsibility can be assigned to a CDF, a CGF, or a BD. Alternately, the fetch responsibility can be set to all. In this embodiment, the fetch responsibility is assigned in a serial order. For example, the CDF would retrieve the missed parameters. If it failed in retrieving the parameters, the CGF would retrieve the missed parameters. If it failed in retrieving the parameters, the BD would retrieve the parameters. This ensures that CDRs are finalized as soon as possible on a high-transaction platform like the CCF. Further, the unavailability of one or more databases to be queried does not stall the processing pipeline at the CCF itself.

In accordance with a further exemplary embodiment, CCF 103 optimizes the retrieval of missed parameters by indicating that the retrieval of the data can be done during a non-peak time to reduce network traffic.

In accordance with a further exemplary embodiment, CCF 103 optimizes the retrieval of missed parameters by organizing the data retrieval to be in batch requests. CCF 103 can fill multiple CDRs for a single subscriber, multiple subscribers, single call/session or multiple sessions. CCF 103 or the BD preferably generate complete CDRs after filling required all fields.

Network DB 102 retrieves missed parameters utilizing the index. Network DB 102 sends Missed Parameters Message 213 to CCF 103. Missed Parameters Message 213 includes the missed parameters that were retrieved utilizing the index.

CCF 103 receives Missed Parameters Message 213 from Network DB 102. CCF 103 determines the missed parameters from Missed Parameters Message 213 utilizing the index from the reduced ACR.

CCF 103 sends Report Message 211 to PCEF 101.

In accordance with an exemplary embodiment, the generation and storage of the reduced CDR provides a significant reduction in an overload condition and storage space, which are now big issues for service providers.

While this invention has been described in terms of certain examples thereof, it is not intended that it be limited to the above description, but rather only to the extent set forth in the claims that follow.

We claim:

1. A method for determining charging at a charging control function, the method comprising:
   receiving a reduced automatic charging relay (ACR) at the charging control function, the reduced ACR comprising a charging data subset and an index for charging parameters that were omitted from the reduced ACR;
   retrieving the charging parameters that were omitted from the reduced ACR from a database utilizing the index; and
   generating a first charging data record (CDR) by combining the charging data subset and the charging parameters that were omitted from the reduced ACR.

2. A method for determining charging at a charging control function in accordance with claim 1, wherein the step of receiving a reduced ACR comprises receiving a reduced ACR for event-based charging.

3. A method for determining charging at a charging control function in accordance with claim 1, wherein the step of receiving a reduced ACR comprises receiving a reduced ACR for session-based charging.

4. A method for determining charging at a charging control function in accordance with claim 1, wherein the reduced ACR includes only the charging parameters that are required to provide charging.

5. A method for determining charging at a charging control function in accordance with claim 4, wherein the charging parameters that are required to provide charging comprise positional charging values.

6. A method for determining charging at a charging control function in accordance with claim 4, wherein the charging parameters that are required to provide charging comprise non-positional charging values.

7. A method for determining charging at a charging control function in accordance with claim 1, wherein the index comprises call/session data.

8. A method for determining charging at a charging control function in accordance with claim 1, wherein the index comprises network data.

9. A method for determining charging at a charging control function in accordance with claim 8, wherein the network data comprises Charging Trigger Function data.

10. A method for determining charging at a charging control function in accordance with claim 1, wherein the index comprises service data.

11. A method for determining charging at a charging control function in accordance with claim 10, wherein the service data comprises a Short Message Service Center (SMSC) message.

12. A method for determining charging at a charging control function in accordance with claim 10, wherein the service data comprises a Multimedia Messaging Service Centre (MMSC) message.

13. A method for determining charging at a charging control function in accordance with claim 10, wherein the service data comprises a MultiMedia Telephony service (MMTel) message.

14. A method for determining charging at a charging control function in accordance with claim 1, wherein the index comprises single service charging information data.

15. A method for determining charging at a charging control function in accordance with claim 1, wherein the index comprises single multiple service charging information data.

16. A method for determining charging at a charging control function in accordance with claim 1, wherein the step of retrieving the charging parameters that are not included in the reduced ACR comprises optimizing the retrieval of the charging parameters that are not included in the reduced ACR by utilizing a time-to-live (TTL) parameter.

17. A method for determining charging at a charging control function in accordance with claim 16, wherein the step of retrieving the charging parameters that are not included in the reduced ACR comprises retrieving the charging parameters that are not included in the reduced ACR only if the TTL parameter indicates that a new query should be made for a parameter.

18. A method for determining charging at a charging control function in accordance with claim 17, wherein the step of retrieving the charging parameters that are not included in the reduced ACR comprises utilizing a previously cached version of the charging parameters.

19. A method for determining charging at a charging control function in accordance with claim 1, wherein the step of retrieving the charging parameters that are not included in the reduced ACR comprises optimizing the retrieval of the charging parameters that are not included in the reduced ACR retrieving the charging parameters during a non-peak time.

20. A method for determining charging at a charging control function, the method comprising:
   receiving a reduced automatic charging relay (ACR) at the charging control function, the reduced ACR comprising a charging data subset and an index for other charging parameters;
   retrieving the other charging parameters from a database utilizing the index; and
   generating a first charging data record (CDR) by combining the charging data subset and the other charging parameters.

21. An apparatus for determining charging at a charging control function, the apparatus comprising:
   a processor configured to:
      receive a reduced automatic charging relay (ACR), the reduced ACR comprising a charging data subset and an index for charging parameters that were omitted from the reduced ACR;
      retrieve the charging parameters that were omitted from the reduced ACR from a database utilizing the index; and
      generate a first charging data record (CDR) by combining the charging data subset and the charging parameters that were omitted from the reduced ACR.

22. An apparatus for determining charging at a charging control function, the apparatus comprising:
   a processor configured to:
      receive a reduced automatic charging relay (ACR), the reduced ACR comprising a charging data subset and an index for other charging parameters;
      retrieve the other charging parameters from a database utilizing the index; and
      generate a first charging data record (CDR) by combining the charging data subset and the other charging parameters.

* * * * *